United States Patent
Lauderdale, II et al.

(10) Patent No.: US 8,159,951 B2
(45) Date of Patent: Apr. 17, 2012

(54) SYSTEM AND METHOD FOR EC/IO ACCESS SCREENING IN A CDMA NETWORK

(75) Inventors: Robert P. Lauderdale, II, Richardson, TX (US); Jian Xiong Lu, Bei Jing (CN); Qihong Liu, Xi An (CN); Bing Zheng, Beijing (CN); Michael Woodmansee, Plano, TX (US)

(73) Assignee: Rockstar Bidco, LP, New York, NY (US)

( * ) Notice: Subject to any disclaimer, the term of this patent is extended or adjusted under 35 U.S.C. 154(b) by 1047 days.

(21) Appl. No.: 11/861,668

(22) Filed: Sep. 26, 2007

(65) Prior Publication Data
US 2008/0151838 A1    Jun. 26, 2008

(30) Foreign Application Priority Data

Sep. 29, 2006    (CN) .......................... 2006 1 0168940

(51) Int. Cl.
| | |
|---|---|
| H04L 1/00 | (2006.01) |
| H04L 12/26 | (2006.01) |
| H04M 1/66 | (2006.01) |
| H04M 1/68 | (2006.01) |
| H04M 3/16 | (2006.01) |
| H04M 3/42 | (2006.01) |
| H04W 72/00 | (2009.01) |

(52) U.S. Cl. ...................... 370/235; 455/410; 455/414.1; 455/415; 455/452.1; 455/509

(58) Field of Classification Search .................. 370/235; 455/410, 436, 452.1, 414.1, 437, 415, 509
See application file for complete search history.

(56) References Cited

U.S. PATENT DOCUMENTS

| | | | | |
|---|---|---|---|---|
| 5,713,072 | A  * | 1/1998 | Marth et al. ................... | 455/410 |
| 6,026,301 | A  * | 2/2000 | Satarasinghe ................. | 455/436 |
| 6,078,817 | A  * | 6/2000 | Rahman ..................... | 455/452.1 |
| 7,224,972 | B2 * | 5/2007 | Pischella ....................... | 455/436 |
| 7,623,880 | B2 * | 11/2009 | Sinnarajah et al. ........... | 455/509 |
| 2003/0031130 | A1* | 2/2003 | Vanghi .......................... | 370/235 |
| 2004/0203655 | A1* | 10/2004 | Sinnarajah et al. ........ | 455/414.1 |
| 2004/0266352 | A1* | 12/2004 | Kuurne et al. ............... | 455/63.1 |
| 2005/0085230 | A1* | 4/2005 | Welnick et al. ............... | 455/437 |
| 2005/0202821 | A1* | 9/2005 | Pischella ....................... | 455/436 |
| 2006/0286970 | A1* | 12/2006 | Otobe et al. .................. | 455/415 |
| 2009/0075651 | A1* | 3/2009 | MacNaughtan et al. ...... | 455/434 |

FOREIGN PATENT DOCUMENTS

EP          1370010 A1 * 12/2003

* cited by examiner

*Primary Examiner* — Ronald Abelson
(74) *Attorney, Agent, or Firm* — Haynes and Boone, LLP

(57) ABSTRACT

Provided are system and method for performing access screening in a CDMA network. In one embodiment, the method comprises comparing a strength of a reference pilot specified in an origination message ("ORM") received from the mobile unit to at least one of an upper pilot strength threshold ("UPST") and a lower pilot strength threshold ("LPST"); responsive to the reference pilot strength failing to exceed the LPST, redirecting the mobile unit; responsive to the reference pilot strength exceeding the LPST but failing to exceed the UPST, determining whether an additional pilot is reported having a strength greater than that of the reference pilot; and responsive to a determination that no additional pilot is reported having a strength greater than that of the reference pilot, redirecting the mobile unit.

21 Claims, 2 Drawing Sheets

SYSTEM AND METHOD FOR EC/IO ACCESS SCREENING IN A CDMA NETWORK

CROSS-REFERENCE

This application claims priority to Chinese patent application number 200610168940.7, filed Sep. 29, 2006, the disclosure of which is incorporated herein by reference.

BACKGROUND

The following disclosure relates generally to communications systems and, more particularly, to Ec/Io access screening in a code division multiple access ("CDMA") network.

Ec/Io is the ratio of received pilot energy (Ec) to total received energy or the total power spectral density (Io) expressed in dB. Ec/Io is a CDMA-only reading and is sometimes referred to as pilot strength. A ratio of −10 dB to −14 dB is normal; ratios higher than −14 dB are progressively worse to −31.5 dB, at which power readings are immeasurable.

It has been noted that, for a live customer market, approximately 25% of all origination access failures occur when the active pilot strength is low and approximately 13% of all origination drops occur under these conditions. Screening based solely on the Ec/Io of the primary or reference pilot result in a higher number of calls being redirected without a significant increase in performance.

SUMMARY

In one embodiment, a method of performing access screening in a CDMA network is provided. The method comprises comparing a strength of a reference pilot specified in an origination message ("ORM") received from the mobile unit to at least one of an upper pilot strength threshold ("UPST") and a lower pilot strength threshold ("LPST"); responsive to the reference pilot strength failing to exceed the LPST, redirecting the mobile unit; responsive to the reference pilot strength exceeding the LPST but failing to exceed the UPST, determining whether an additional pilot is reported having a strength greater than that of the reference pilot; and responsive to a determination that no additional pilot is reported having a strength greater than that of the reference pilot, redirecting the mobile unit.

Other aspects and features of the present disclosure will become apparent to those ordinarily skilled in the art upon review of the following description of specific embodiments of the disclosure in conjunction with the accompanying figures.

DETAILED DESCRIPTION OF A PREFERRED EMBODIMENT

Figure 1:
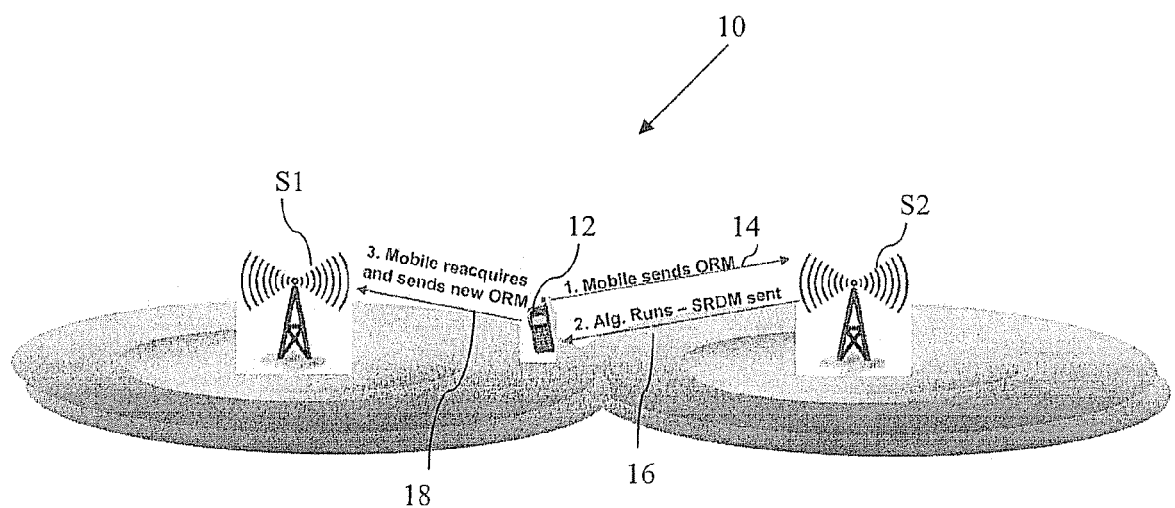
FIG. 1 illustrates a CDMA network in which an Ec/Io access screening method of one embodiment is advantageously implemented.

The present disclosure relates generally to communications systems and, more particularly, to Ec/Io access screening method for use in a code division multiple access ("CDMA") network. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As used herein, the following terms have the following meanings:

Ec—Pilot energy accumulated over one pseudo-noise ("PN") chip period.

Io—Total power spectral density in the received bandwidth.

Ec/Io—The ratio in dB between the pilot energy accumulated over one PN chip period ("Ec") to the total power spectral density in the received bandwidth ("Io").

Channel Assignment into Soft Handoff ("CASHO") (as defined in TIA/EIA/IS-2000)—The ability of the system to accept the report of multiple pilot PNs from a mobile and use that report to assign multiple sectors ("PNs") to the mobile in the Channel Assignment Message.

Pilot PN—The Pilot PN Sequence Offset Index.

Pilot PN Sequence Offset Index—The PN offset in units of 64 PN chips of a pilot, relative to the zero offset pilot PN sequence.

Pilot PN Sequence—A pair of modified maximal length PN sequences with a period $2^{15}$ used to spread the Forward CDMA Channel and the Reverse CDMA channel. Different base stations are identified by different pilot PN sequence offsets.

Pilot Channel—An unmodulated, direct-sequence spread spectrum signal transmitted continuously by each CDMA base station. The pilot Channel allows a mobile to acquire the timing of the Forward CDMA Channel, provides a phase reference for coherent demodulation, and provides a means for signal strength comparisons between base stations for determining when to handoff.

PN Sequence—A periodic binary sequence with "0" mapped to "1" and "1" mapped to "−1".

PN Chip—The time duration of one binary bit in the PN sequence.

AF—Access failure.

Origination Message ("ORM") Received Flag—Software flag that indicates that an origination message has been received.

Reference Pilot/Reference PN—The pilot PN corresponding to the base station where the mobile unit is originating.

Additional PNs—Pilot PNs corresponding to base stations other than the base station where the mobile unit is originating that the mobile unit is able to receive and of which the mobile unit is able to measure the strength.

FIG. 1 illustrates a portion of a CDMA network 10 in which features of embodiments such as those described herein may be advantageously implemented. As shown in FIG. 1, the CDMA network 10 is divided into a plurality of sectors each having a base station, as represented in FIG. 1 by base stations BS1 and BS2, with which a mobile unit 12 may communicate in a conventional manner. In accordance with embodiments described herein, to initiate communications, the mobile unit 12 sends an Origination Message ("ORM") to the base station of its current reference sector. The ORM contains information as to the strength of the primary or reference PN. The ORM may also contain information regarding the strengths of additional PNs corresponding to other base station sectors.

Using the example illustrated in FIG. 1, as indicated by an arrow 14, the mobile unit 12 sends an ORM to the base station BS2. It will be assumed for the sake of example that the mobile unit is not currently using the optimum sector as its reference sector. Accordingly, responsive to receipt of the ORM, the base station BS2 runs the Ec/Io access screening method, which will be described in greater detail below with reference to FIG. 2, and upon determining that the strength of the reference pilot is weak, sends a Service Redirection Message ("SRDM") to the mobile unit 12, as indicated by an arrow 16. In response to receipt of the SRDM, the mobile unit 12 enters a System Determination Substate, in which it reacquires the network 10 (as defined in TIA/EIA/IS-2000), selects a different sector (e.g., base station BS1) as its reference sector, and sends an ORM to its new reference sector. Using the example illustrated in FIG. 1, as indicated by an arrow 18, having selected the base station BS1 as its new reference sector, the mobile unit 12 sends an ORM thereto. The process described above is repeated for the new reference sector.

It will be recognized that a significant number of origination attempts occur on weak pilots, which are defined herein as pilots having an Ec/Io, or pilot strength, below an "Upper Pilot Strength Threshold", or "UPST". Redirecting a mobile unit originating on a weak pilot enables the mobile unit to move to a stronger pilot (e.g., one having an Ec/Io that exceeds the UPST) prior to attempting another origination. Upon receipt of an SRDM, the mobile unit enters a System Determination Substate, in which the mobile unit reacquires the system and selects a new pilot, at which point the mobile unit resends the ORM. If the mobile unit reports additional pilots that are stronger than the reference pilot, a redirection may not be necessary unless the reference is very weak; that is, the Ec/Io thereof is below a "Lower Pilot Strength Threshold", or "LPST". Checking the ORM Received Flag prior to mobile unit redirection ensures that the current origination is not a duplicate of a previously sent origination.

Figure 2:
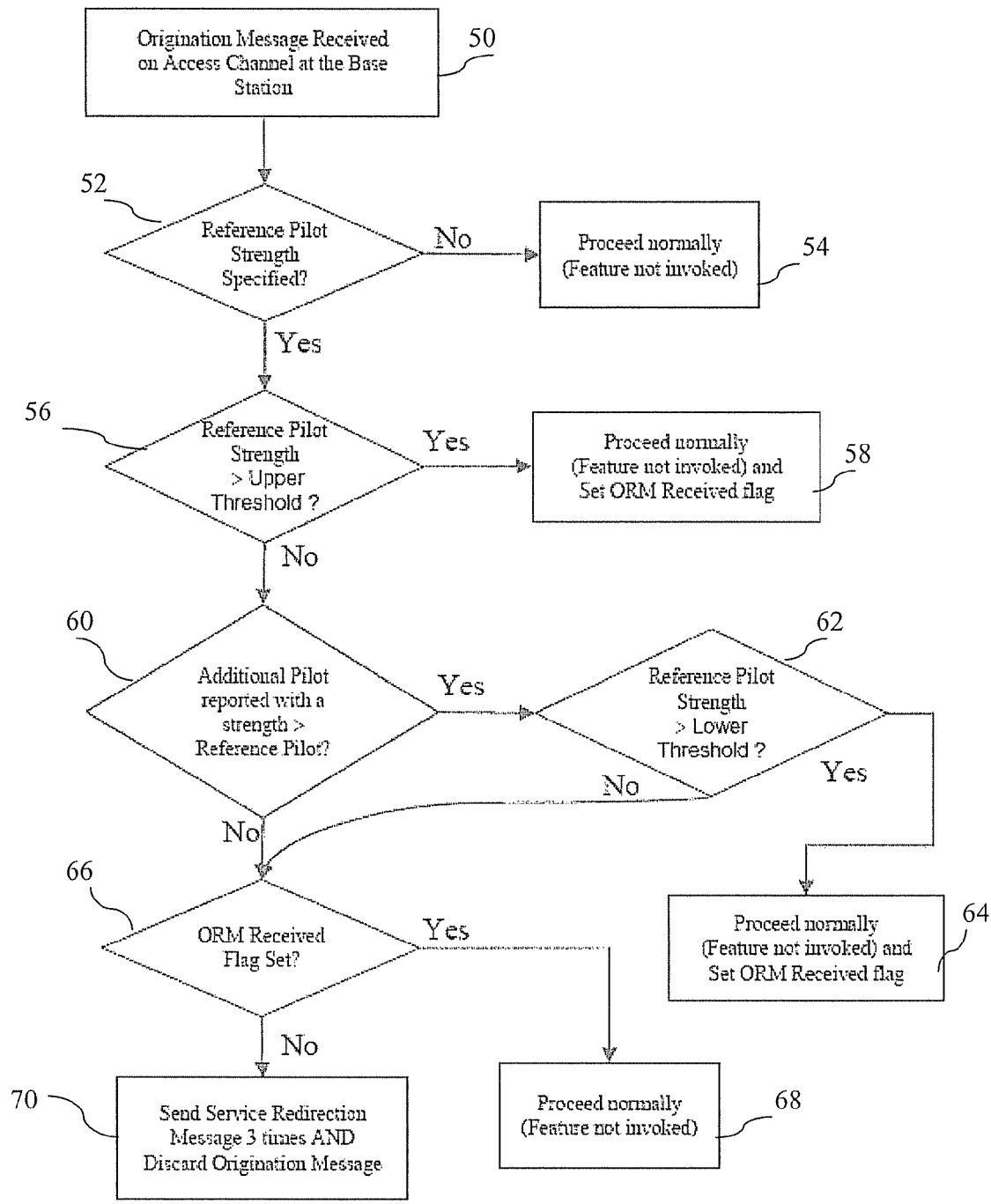
FIG. 2 is a flowchart of an Ec/Io access screening method of one embodiment.

FIG. 2 is a flowchart of a Ec/Io access screening method in accordance with one embodiment. As noted above with reference to FIG. 1, the Ec/Io access screening method may be implemented at each of the base stations of a CDMA network. In one embodiment, each base station may include a computer and a computer program product stored on a computer-readable medium and comprising computer-executable instructions for implementing the Ec/Io access screening method at the base station.

Referring to FIG. 2, in step 50, an ORM is received from a mobile unit on an access channel. In step 52, a determination is made whether a reference pilot strength is specified. If not, in step 54, no redirection is called for by the Ec/Io access screening method described herein and execution proceeds normally; otherwise, execution proceeds to step 56. In step 56, a determination is made whether the specified reference pilot strength is greater than the UPST. If so, in step 58, no redirection is called for by the Ec/Io access screening method described herein and execution proceeds normally. Additionally, in step 58, the ORM Received flag is set. If a negative determination is made in step 56, in step 60, a determination is made whether an additional pilot is reported having a strength greater than that of the reference pilot. If so, execution proceeds to step 62, in which a determination is made whether the strength of the reference pilot exceeds the LPST.

If a positive determination is made in step 62, execution proceeds to step 64, in which no redirection is called for by the Ec/Io access screening method described herein and execution proceeds normally. Additionally, in step 64, the ORM Received flag is set. If a negative determination is made in either of steps 60 or 62, execution proceeds to step 66, in which a determination is made whether the ORM flag is set to ensure that this is not a duplicate origination. If the ORM flag is set, execution proceeds to step 68, in which no redirection is called for by the Ec/Io access screening method described herein and execution proceeds normally. If a negative determination is made in step 66, in step 70, a "Service Redirection Message" is sent multiple (e.g., three) times and the ORM is discarded. This step results in redirection of the mobile unit.

It will be recognized that the steps illustrated in FIG. 2 may be performed in a different order; for example, it may be preferable in some instances to determine first whether the specified reference pilot strength exceeds the LPST, with originations having specified reference pilot strengths that fall below the LPST being redirected. In summary, implementation of the Ec/Io access screening method and system produce the following results. Originations having a reference pilot strength above the UPST are not redirected. Originations having a reference pilot strength between the UPST and the LPST and with no additional pilot reported having a strength between the UPST and the LPST are redirected. Originations having a reference pilot strength between the UPST and LPST and including at least one additional pilot having a strength greater than that of the reference pilot are not redirected. Originations with a reference pilot below the LPST are always redirected.

As a result of the embodiments described herein, originations on weak pilots are given an opportunity to change to stronger pilots. Redirections where both the mobile terminal and network support CASHO and that feature is turned on are avoided if additional pilots stronger than the reference are present; therefore, unnecessary redirections are avoided. In addition, access failures and dropped calls due to weak pilots are reduced.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method of performing access screening in a code division multiple access ("CDMA") network, the CDMA network comprising a plurality of base stations for communicating with a mobile unit, the method comprising:
   comparing a strength of a reference pilot specified in an origination message ("ORM") received from the mobile unit to at least one of an upper pilot strength threshold ("UPST") and a lower pilot strength threshold ("LPST");
   responsive to the reference pilot strength failing to exceed the LPST, redirecting the mobile unit;
   responsive to the reference pilot strength exceeding the LPST but failing to exceed the UPST,
     determining whether an additional pilot is reported having a strength greater than that of the reference pilot; and
     responsive to a determination that no additional pilot is reported having a strength greater than that of the reference pilot, redirecting the mobile unit.

2. The method of claim 1 further comprising, responsive to the reference pilot strength exceeding the UPST, setting an origination message ("ORM") received flag and forgoing redirection of the mobile unit.

3. The method of claim 1 further comprising:
    prior to redirecting the mobile unit, determining whether an origination message ("ORM") received flag is set; and
    responsive to a determination that the ORM received flag is set, forgoing redirection of the mobile unit.

4. The method of claim 1 wherein redirecting the mobile unit comprises sending a Service Redirection Message ("SRDM") to the mobile unit.

5. The method of claim 4 wherein the sending a SRDM to the mobile unit comprises sending the SRDM to the mobile unit multiple times.

6. The method of claim 1 wherein redirecting the mobile unit further comprises discarding the ORM.

7. The method of claim 1 wherein the reference pilot strength is measured in decibels.

8. The method of claim 1 wherein the reference pilot strength is equal to Ec/Io, wherein Ec is pilot energy accumulated over one pseudo-noise chip period and Io is total power spectral density in a received bandwidth.

9. A system for performing access screening in a base station of a code division multiple access ("CDMA") network, the system comprising:
    means for comparing a reference pilot strength specified in an origination message ("ORM") received from a mobile unit with an upper pilot strength threshold ("UPST") and a lower pilot strength threshold ("LPST");
    means for redirecting originations wherein the specified reference pilot strength is between the UPST and the LPST and wherein no additional pilot is reported having a strength between the UPST and the LPST; and
    means for redirecting originations wherein the specified reference pilot strength is below the LPST.

10. The system of claim 9 wherein each of the means for redirecting further comprises means for determining whether an ORM received flag is set and forgoing redirecting the mobile unit when the ORM received flag is set.

11. The system of claim 9 wherein each of the means for redirecting comprises means for sending a Service Redirection Message ("SRDM") to the mobile unit.

12. The system of claim 11 wherein each of the means for redirecting comprises means for sending the SRDM to the mobile unit multiple times.

13. The system of claim 9 wherein each of the means for redirecting comprises means for discarding the ORM.

14. The system of claim 9 wherein pilot strength is measured in decibels.

15. The system of claim 9 wherein pilot strength is equal to Ec/Io, wherein Ec is pilot energy accumulated over one pseudo-noise chip period and Io is total power spectral density in a received bandwidth.

16. A computer program product comprising a non-transitory computer readable medium having stored thereon a plurality of instructions for performing access screening in a code division multiple access ("CDMA") network, the instructions for:
    comparing a strength of a reference pilot specified in an origination message ("ORM") received from a mobile unit to at least one of an upper pilot strength threshold ("UPST") and a lower pilot strength threshold ("LPST");
    responsive to the reference pilot strength failing to exceed the LPST, redirecting the mobile unit;
    responsive to the reference pilot strength exceeding the LPST but failing to exceed the UPST,
    determining whether an additional pilot is reported having a strength greater than that of the reference pilot; and
    responsive to a determination that no additional pilot is reported having a strength greater than that of the reference pilot, redirecting the mobile unit.

17. The computer program product of claim 16 further comprising instructions for, responsive to the reference pilot strength exceeding the UPST, setting an origination message ("ORM") received flag and forgoing redirection of the mobile unit.

18. The computer program product of claim 16 further comprising instructions for:
    prior to redirecting the mobile unit, determining whether an origination message ("ORM") received flag is set; and
    responsive to a determination that the ORM received flag is set, forgoing redirection of the mobile unit.

19. The computer program product of claim 16 wherein the instructions for redirecting the mobile unit further comprise instructions for sending a Service Redirection Message ("SRDM") to the mobile unit.

20. The computer program product of claim 19 wherein the instructions for sending a Service Redirection Message ("SRDM") to the mobile unit comprise instructions for sending the SRDM to the mobile unit multiple times.

21. The computer program product of claim 16 wherein instructions for redirecting the mobile unit further comprise instructions for discarding the ORM.

\* \* \* \* \*